Sept. 13, 1960 D. C. DAVIS 2,952,849
RADIANT ENERGY RECEIVER
Filed Nov. 20, 1956 3 Sheets-Sheet 1

DONOVAN C. DAVIS
INVENTOR.

BY
ATTORNEY

DONOVAN C. DAVIS
INVENTOR.

United States Patent Office 2,952,849
Patented Sept. 13, 1960

2,952,849

RADIANT ENERGY RECEIVER

Donovan C. Davis, Pasadena, Calif., assignor to Gilfillan Bros., Inc., Los Angeles, Calif., a corporation of California Filed Nov. 20, 1956, Ser. No. 623,499

11 Claims. (Cl. 343—119)

This invention relates to direction finding receivers and more particularly to means for indicating the angular position of a radiant energy source.

The receiver of the present invention has a large scope of applications as do all similar direction finder receiver systems; however, the invention has particular utility in countermeasure applications where certain severe operating requirements are generally imposed.

For example, in military applications a direction finding receiver should have a minimum weight, occupy a minimum amount of space and be easy to maintain as it is possible to make it. On the other hand, the effective jamming of an enemy radar requires that a rapid and a reasonably accurate indication be made of the angular position of an enemy radar transmitter. The receiver employed to produce this indication must often also be sensitive to only a single burst of microwave energy from a source having a bearing and an elevation substantially anywhere within the radar horizon of the receiver.

In accordance with the invention, a direction finding receiver is provided to meet all of these requirements. The receiver is especially constructed to be used with means to indicate, i.e. to display visually or to register or to record visually or nonvisually, the angular position of a source of radiant energy. The receiver accordingly comprises at least two antennas having approximately intersecting lines of sight disposed at an angle with respect to each other less than 180 degrees, the shape of the patterns being such that the vector sum of the output signal amplitude of each of the antennas responsive to the transmitted signal of the radiant energy source is equal to a vector of a constant magnitude, the constant magnitude being equal to the output of the antennas when the source is in the line of sight of each, respectively, and means for indicating the sum of the output signal amplitudes vectorially.

According to the preferred practice of the invention, the bearing of a radiant energy source is determined by the combination of four antennas having lines of sight in a single horizontal plane, three of the antennas having their lines of sight respectively disposed at 90, 180 and 270 degrees with respect to the position of the line of sight of the remaining one of the antennas, the polar magnitude of each of the antenna patterns of each of the antennas in a plane through their lines of sight being a cosine function of the angle from their respective lines of sight, and means responsive to the transmitted signal of the radiant energy source for indicating the sum of the output signals of the antennas vectorially.

Also, according to a preferred practice of the invention, apparatus is employed to determine the elevation angle of a radiant energy source including a first electromagnetic antenna having a vertical line of sight and having a spherical antenna pattern, a second electromagnetic antenna having omni-directional lines of sight in a horizontal plane and having a horizontally disposed toroidal antenna pattern with the inside diameter of the toroid being equal to zero, and means for indicating the sum of the output signal amplitudes of the antennas vectorially.

In either case, the indicating means preferably includes a cathode-ray tube having two deflection means disposed about its longitudinal axis at an angle of 90 degrees with respect to each other, and means are additionally provided to sweep the cathode ray of the tube along the transverse axis of one deflection means at a rate proportional to the amplitude of one of the output signals of one of the antennas, or in the case of the four antennas one of each oppositely disposed pair. The indicating means also includes means for sweeping the cathode ray along the transverse axis of the other deflection means at a rate proportional to the output of the other of the antennas receiving the transmitted signal of the radiant energy source.

In either case stated above, if the energy transmitted by the radiant energy source is pulsed microwave energy, the cathode ray sweeping means may include simply a detector to sweep the cathode ray of the tube at a rate proportional to the slope of the leading edge of any received microwave pulses. As will be explained subsequently, the slope of the leading edge of a microwave pulse in the system of the present invention will be proportional to the amplitude of the pulse received through each antenna.

When it is desired to receive not only pulsed microwave energy but also continuous microwave energy, the cathode-ray sweeping means preferably includes a sawtooth generator for impressing sawtooth voltages proportional to the amplitudes of each of the output signals of the pair of antennas receiving the radiant energy transmitted by the source on each of the deflection means respectively of the cathode ray tube. A gate generator is also provided for operating the sawtooth generator and a threshold gate is provided to pass the output signal of the gate generator whenever a signal of a sufficiently high or predetermined strength is received.

In the case where four antennas or four electromagnetic horns are employed, the deflection means includes a pair of deflection elements, for example, electrostatic deflection plates. In this case, each horn may be connected to a corresponding one of the deflection plates.

It is thus obvious from the foregoing that radiant energy receiver of the invention may have a minimum weight, occupy a minimum amount of space, and may be very easily maintained. In addition, the angular position of an enemy radar transmitter may be easily displayed substantially instantaneously as a signal is received therefrom. The diameter of a cathode ray impinging on a luminescent screen in a conventional cathode ray tube may also be of such a size to make the indicator of the invention reasonably accurate. Furthermore, simply by using a long persistence phosphor in the luminescent screen, the indicator of the invention may be made sensitive to a single burst or pulse of microwave energy.

It is therefore an object of the invention to provide a system for indicating the angular position of a source of radiant energy having a relatively small number of uncomplicated and inexpensive components.

It is another object of the invention to provide means to indicate the angular position of a radiant energy source reasonably accurately, the system being sensitive to a single burst of electromagnetic wave energy.

It is still another object of the invention to provide a system for sweeping the electron beam of a cathode-ray tube indicator at an angle proportional to the angular position of a source of radiant energy.

A further object of the invention is to provide a radiant energy receiver responsive to a single pulse of microwave energy for displaying the angular position of the source of the pulsed energy without the necessity of generating special sawtooth sweep voltages therefor.

Yet another object of the invention is to provide means for indicating the position of a source of radiant energy as a linear function of the angular position of a substantially straight strobe line on the luminescent screen of the cathode ray tube.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 5:
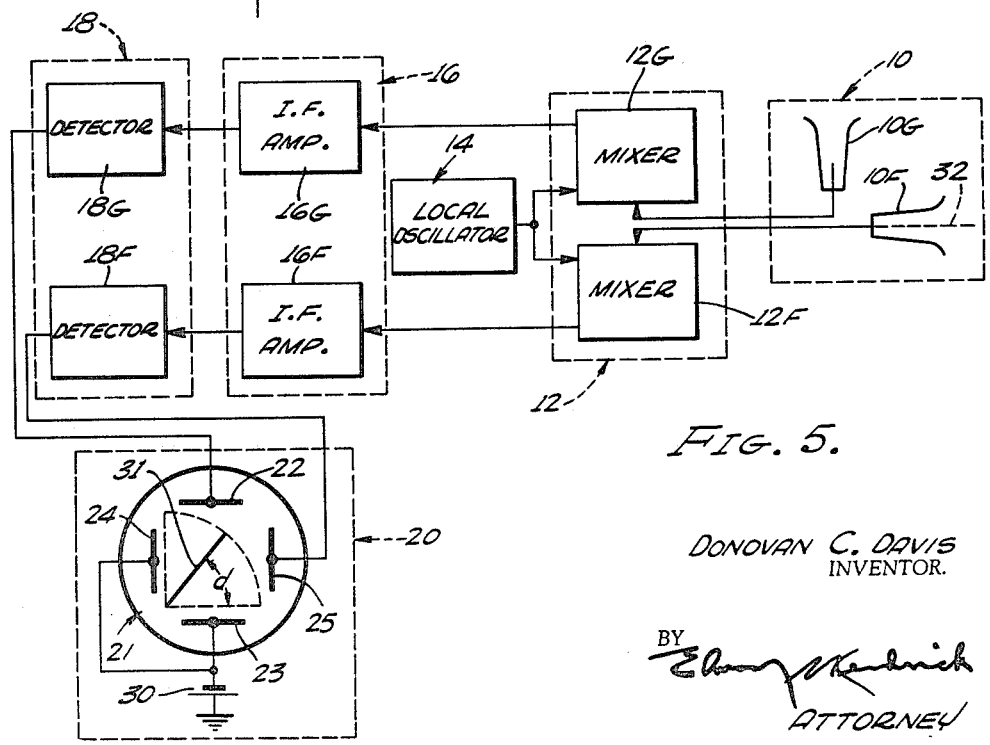
Fig. 5 is a schematic diagram of still another embodiment of the invention.
Figure 7:
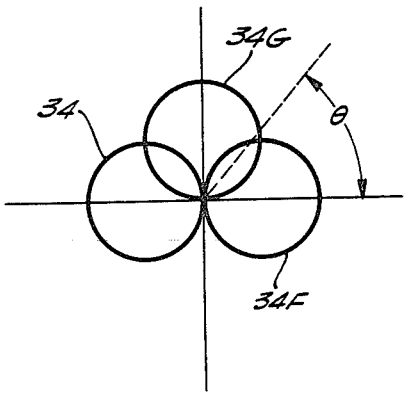
Figure 8:
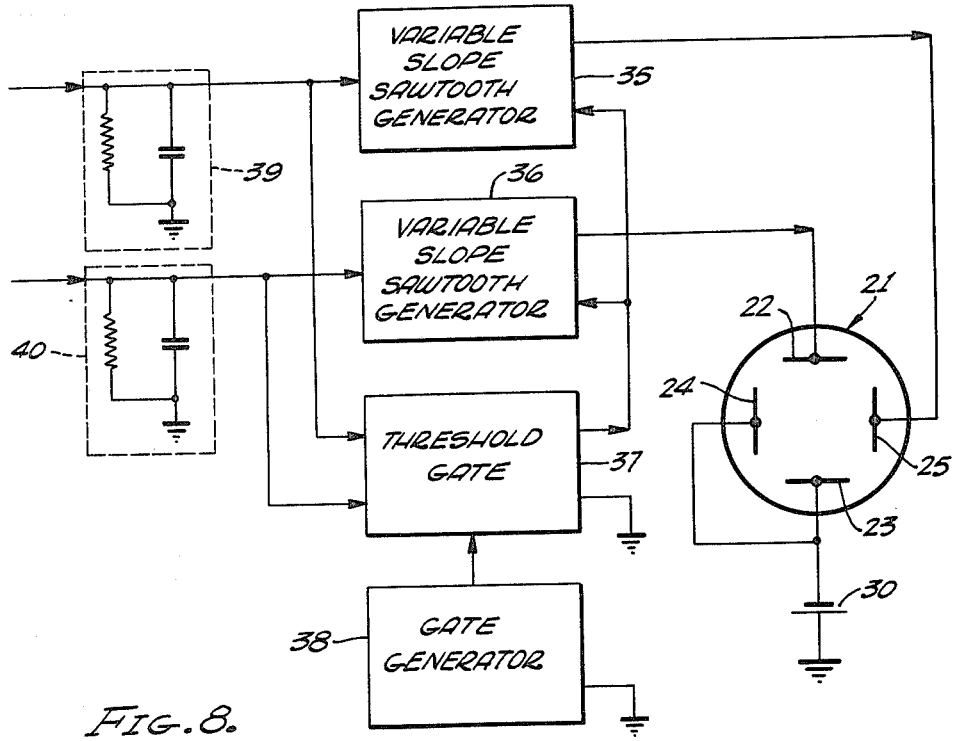

Fig. 7 is a graph of still other antenna patterns which may be employed with the embodiment of the invention shown in Fig. 5 to obtain the elevation of a radar transmitter located at any bearing from the antenna shown in Fig. 5; and Fig. 8 is a schematic diagram of an indicator assembly which may be alternatively employed with the invention to produce an indication of the angular position of a radiant energy source transmitting continuous microwave energy.

Figure 1:
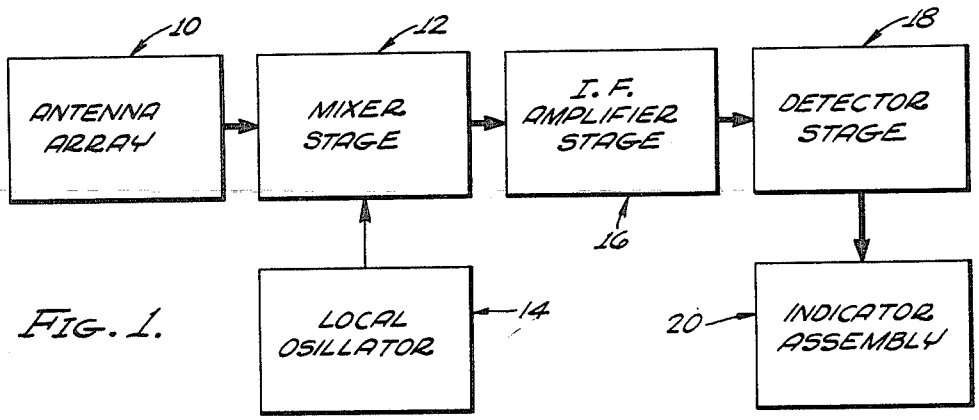
Fig. 1 is a general block diagram of the receiver of the invention.

In the drawing in Fig. 1 a block diagram of the invention is shown including an antenna array 10 which may include one or more pairs of antennas disposed at an angle with respect to each other less than 180 degrees, a mixer stage 12 including a pair of mixers for each pair of antennas in the array 10, a local oscillator 14 for all the mixers in stage 12, an IF amplifier stage 16 connected at the output of mixer stage 12, and a detector stage and indicator assembly 18 and 20 connected from IF amplifier stage 16, respectively. Stages 16 and 18 may have a pair of IF amplifiers and detectors respectively for each pair of the antennas in array 10 or a pair of mixers in stage 12.

Figure 2:
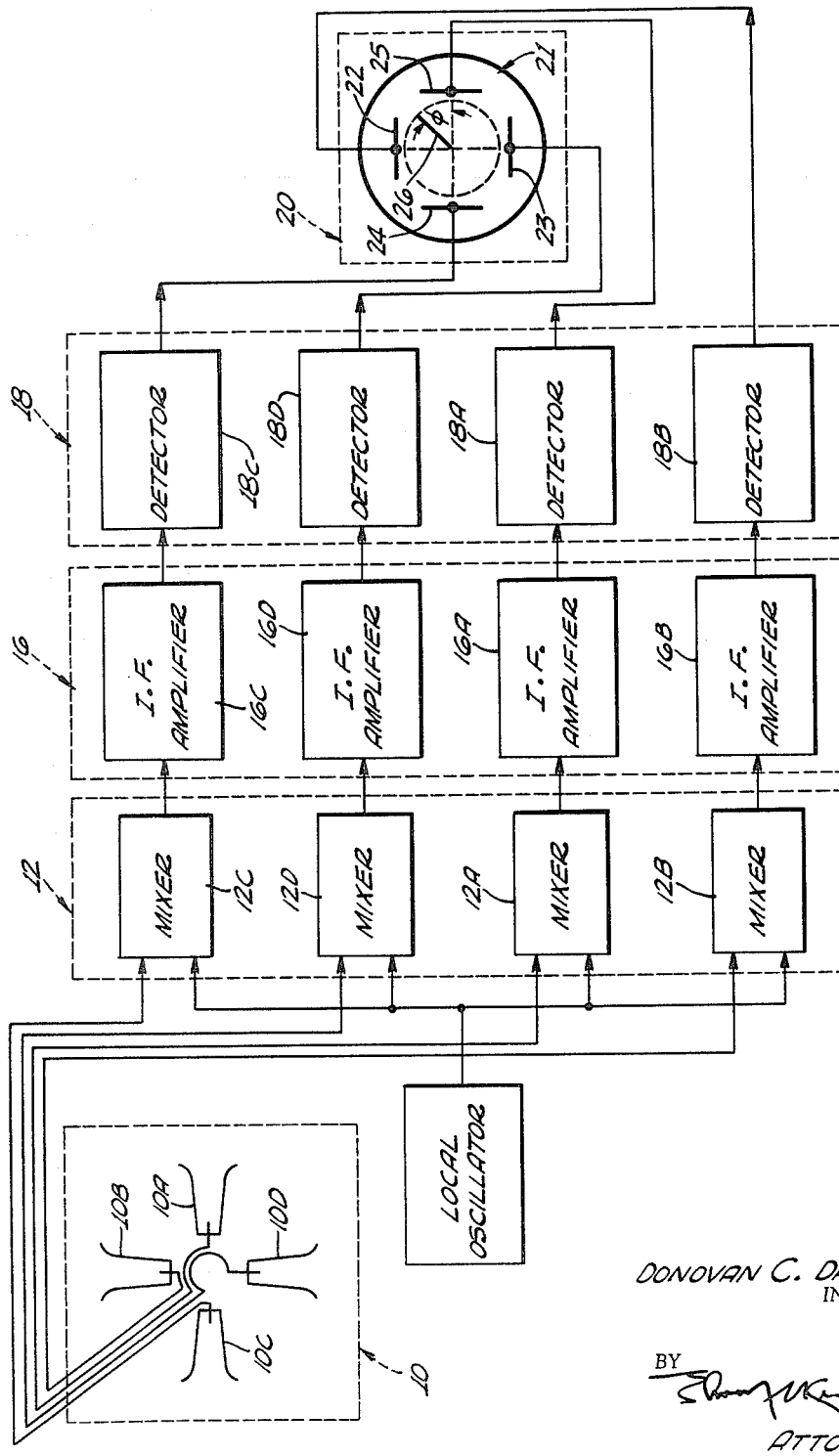
Fig. 2 is a more detailed block diagram of one embodiment of the invention.

In one specific embodiment of the invention shown in Fig. 2, antenna array 10 may include four antennas or horns 10A, 10B, 10C and 10D, which are preferably disposed at 90 degrees with respect to each other to determine the bearing of a radiant energy source. Four mixers 12A, 12B, 12C and 12D are then connected respectively from the antennas 10A, 10B, 10C and 10D in mixer stage 12 which provides outputs for corresponding IF amplifiers 16A, 16B, 16C and 16D, mixers 12 having a second input from local oscillator 14. The output of amplifiers 16 are then impressed upon four corresponding detectors 18A, 18B, 18C, and 18D, the outputs of which are impressed upon a cathode ray type indicator 21 in an indicator assembly which may include only the cathode ray tube 21.

The cathode ray tube 21 may have two deflection means including vertical deflection plates 22 and 23 and horizontal deflection plates 24 and 25. Although electrostatic deflection plates need not necessarily be employed, if they are employed, each of the detected outputs of stage 18 may be impressed respectively on the plates 22, 23, 24 and 25.

The embodiment of the invention shown in Fig. 2 is designed to produce a strobe line as indicated at 26 in indicator assembly 20 representative of the bearing of a radiant energy source from the antenna array 10. The angle the strobe line 26 forms with the horizontal is indicated at $\phi$. The embodiment shown in Fig. 2 is employed to indicate the bearing of a radiant energy source of pulsed microwave energy. The function of the embodiment shown in Fig. 2 may be better understood by reference to the antenna patterns of horns 10 and the cooperation between detector stage 18 and indicator assembly 20 to product strobe line 26.

Figure 3:
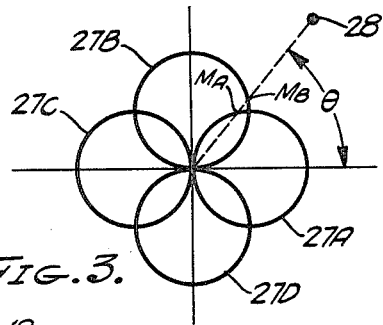
Fig. 3 is a graph of antenna patterns of four antennas shown in the diagram of Fig. 2.

The antenna patterns of horns 10A, 10B, 10C and 10D are illustrated at 27A, 27B, 27C and 27D, respectively, in Fig. 3. The position of a radiant energy source is indicated at 28 and its bearing is indicated by the symbol $\theta$. The inputs to horns 10A and 10B will be of a magnitude from the origin of the graph shown in Fig. 3 to points indicated at $M_A$ to $M_B$. Thus, if the range output signal amplitude of a radiant energy source at 28 are maintained constant it is moved only in bearing, when its bearing is 0, 90, 180 or 270 degrees, the outputs of each of the horns 10A, 10B, 10C and 10D will be the same constant $M_O$, respectively. Hence, the output signal amplitudes of each of the horns 10A, 10B, 10C and 10D, defined as $M_A$, $M_B$, $M_C$ and $M_D$, respectively, can be set down mathematically as follows:

$$M_A = M_O \cosine \theta \quad (1)$$
$$M_B = M_O \sine \theta \quad (2)$$
$$M_C = -M_A \quad (3)$$
$$M_D = -M_B \quad (4)$$

The construction of horns to produce patterns as indicated in Fig. 3 may be easily accomplished.

Figure 4:
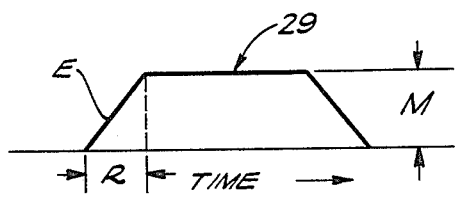
Fig. 4 is a graph of a pulse waveform illustrative of the operation of the embodiment of the invention shown in Fig. 2.

The manner in which the strobe line 26 is produced by sweeping the cathode ray of the tube 21 across, for example, a luminescent screen thereof, to represent the bearing of a radiant energy source, may be better understood by reference to the waveform of a pulse 29 as shown in Fig. 4. The pulse 29 is provided with a leading edge E having a rise time R and a maximum amplitude M. The leading edge E of pulse 29 has a finite and not an infinite value because pulsed microwave energy, which is, of course, made up of a detected alternating voltage, cannot have a leading edge slope any greater than the derivative of the alternating voltage representing the radio frequency energy at time 0. In accordance with the invention, it is not contemplated that detectors be used in the receiver system of the invention to destroy this effect, for it is this effect which obviates the necessity of providing special sweep circuits for a cathode-ray tube when pulsed microwave energy is received. If the maximum amplitude of the output signals of horns 10A and 10B is responsive to the location of a radiant energy source at 28 as illustrated in Fig. 3, it will be seen that the rise time of the leading edge E of pulse 29 will be equal to R which will be a constant, the base of the pulse 29 being a time base. Hence, if the maximum output signal amplitudes of horns 10A and 10B are $M_A$ and $M_B$, $$\frac{M_A}{R} \text{ and } \frac{M_B}{R}$$

will be equal to the slope of the leading edge E of each pulse passed respectively by horns 10A and 10B. By this time it will be apparent that it is the slope of the leading edge that will determine the speed of the electron stream or cathode ray of the tube 21 in the horizontal and vertical direction, the sum of these components being represented by the strobe line 26. The slope of the leading edge E of pulse 29 at the output of horns 10A and 10B may then be defined in the following manner in terms of Equations 1, 2, 3 and 4:

$$S_A = \frac{M_O \cosine \theta}{R} \quad (5)$$

$$S_B = \frac{M_O \sin\theta}{R} \quad (6)$$

$$S_C = -S_A \quad (7)$$

$$S_D = -S_B \quad (8)$$

where $S_A$, $S_B$, $S_C$ and $S_D$ are the slopes of the leading edges of pulses appearing at the outputs of horns 10A, 10B, 10C and 10D, respectively.

Due to the particular positions of electrostatic deflection plates 23 and 24 of tube 21, $\tan\phi$ may be defined as $$\frac{S_B}{S_A}, \frac{S_B}{-S_C}, \frac{-S_D}{-S_C}$$

or $$\frac{-S_D}{S_A}$$

respectively for the four quadrants indicated at the face of the tube 21 in indicator assembly 20 in Fig. 2.

By inspection of Equations 5, 6, 7 and 8, it will be apparent that $$\tan\phi = \frac{S_B}{S_A} = \frac{S_B}{-S_C} = \frac{-S_D}{-S_C} = \frac{-S_D}{S_A} = \tan\theta$$

Hence, $\phi=\theta$ and $\phi$ represents the bearing of a source of radiant energy at the arbitrary point 28 or any point in the system.

Fig. 5 is a schematic diagram of still another embodiment of the invention including all the components 10, 12, 14, 16, 18 and 20 but including only two channels for two antennas 10F and 10G which may be disposed at any angle less than 90 degrees or up to 180 degrees as long as the vector sum of the outputs of the antennas is equal to the maximum output signal amplitude of each. The antennas 10F and 10G may be employed to determine the elevational angle of an airborne radar or to determine the angular position of a radiant energy source within a 90 degree bearing span. The output of antenna 10F is impressed upon mixer 12F which mixes the output of local oscillator 14 and impresses an output signal on IF amplifier 16F which is detected by a detector 18F that is connected to the plate 25 of cathode ray tube 21 included in indicator assembly 20. Similarly, antenna 10G is provided with a mixer 12G, an IF amplifier 16G and a detector 18G, the output of which is connected to deflection plate 22 of tube 21. Plates 23 and 24 are maintained at a potential negative with respect to ground to cause strobe line 31 to be traced substantially over the complete face of the tube 21 at an angle A proportional to the angular position of a radiant energy source taken from the line of sight of antenna 10F as indicated at 32 in Fig. 5.

Figure 6:
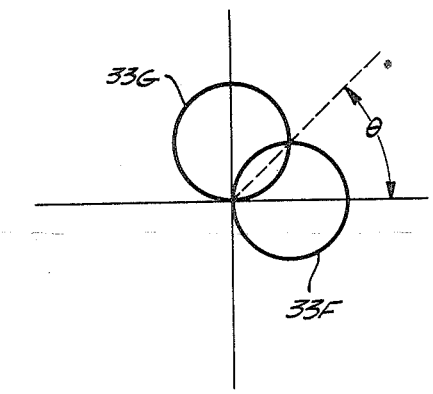
Fig. 6 is a graph of the antenna patterns of two antennas shown in the diagram of Fig. 5.

Antennas 10F and 10G need not be disposed at 90 degrees with respect to each other in space as indicated in Fig. 5, however, if they are, their antenna patterns should be the same as antennas 10A and 10B shown in Fig. 3. These two patterns are indicated in Fig. 6.

Preferably antennas 10F and 10G have patterns as indicated at 34F and 34G as shown in Fig. 7 to determine the elevation angle of a radiant energy source. It is to be noted that the pattern 34F is observed in a vertical plane and is toroidal in its volumetric shape having an inside diameter equal to zero. The pattern of the antenna 10G indicated at 34G is spherical in its three dimensional shape. If it is desired, indicator assembly may include cathode ray tube 21 with biasing source 30 connected to the plates 24 and 23 thereof as shown in Fig. 8. In this case, additional components 35, 36, 37, 38, 39 and 40 are shown which may be employed to produce a strobe line indication of the bearing or elevation of a radiant energy source regardless of whether or not the source radiates pulsed or continuous microwave energy. Smoothing circuits 39 and 40 are provided to insure stabilization of the indicator assembly, the circuits 39 and 40 being connected at the outputs of, for example, detectors 18F and 18G respectively as shown in Fig. 5. These outputs are impressed upon a threshold gate 37 which may include a pair of square law amplifiers and an adder to add the outputs thereof to open threshold gate 37 and pass the output of gate generator 38 to the two variable slope sawtooth generators 35 and 36. Gate generator 38 may be a stable multivibrator. The output of gate generator passed by threshold gate 37 is then employed to operate sawtooth generators 35 and 36 to cause them to sweep the beam of tube 21 across the face of the tube. The beam is swept at a rate both in the horizontal and the vertical direction dependent upon the magnitude of the output signals of circuits 39 and 40, respectively. Thus the slope of each sawtooth produced by generators 35 and 36 are regulated by the amplitude of the signals appearing at the outputs of circuits 39 and 40. This means that the slope of any strobe line produced on the tube 21 will be produced at an angle corresponding to the bearing or elevation of a radiant energy source.

Although some specific changes and modifications of the invention have been shown, many others will of course suggest themselves and be obvious to those skilled in the art. However, the invention is by no means limited by the examples illustrated, but is defined only in the appended claims.

What is claimed is:

1. A receiver for indicating the angular position of a radiant energy source, said receiver comprising: at least two antennas having patterns with approximately intersecting lines of sight disposed at an angle with respect to each other less than 180 degrees, the shape of said patterns being such that the vector sum of the output signal amplitudes of said antennas responsive to the transmitted signal of said radiant energy source is equal to a vector of a constant magnitude with respect to the angular position of said source, said constant magnitude being equal to the output of each of said antennas when said source is in the line of sight of each, respectively; and means for indicating the sum of said output signal amplitudes vectorially, said indicating means including a cathode-ray tube having two deflection means disposed about its longitudinal axis at an angle with respect to each other equal to that between said lines of sight of said antennas, and means for sweeping the cathode ray of said tube along the transverse axis of one of said deflection means at a rate proportional to one of said output signal amplitudes and along the transverse axis of the other of said deflection means at a rate proportional to the other of said output signal amplitudes, simultaneously.

2. The invention as defined in claim 1, wherein the lines of sight of said antennas are disposed at an angle with respect to each other equal to 90 degrees.

3. The invention as defined in claim 2, wherein the polar magnitude of the antenna patterns of each of said antennas in a plane through their lines of sight is a cosine function of the angle from their respective lines of sight.

4. A receiver for indicating the angular position of a radiant energy source, said receiver comprising: four antennas having lines of sight in a single horizontal plane, three of said antennas having their lines of sight respectively disposed at 90, 180 and 270 degrees with respect to the position of the line of sight of the remaining one of said antennas, the polar magnitude of each of the antenna patterns of each of said antennas in a plane through their lines of sight being a cosine function of the angle from their respective lines of sight, and means responsive to the transmitted signal of said radiant energy source for indicating the sum of the output signals of said antennas vectorially, said indicating means including a cathode-ray tube having two deflection means disposed about its longitudinal axis at an angle of 90 degrees with respect to each other, and means for sweeping the cathode ray of said tube along the transverse axis of one of said deflection means in a direction dependent upon which of each of a first oppositely positioned pair of said antennas receives energy from said source and at a rate proportional to the output signal amplitude of the one of said first pair of antennas and for sweeping the cathode ray of said tube along the transverse axis of the other of said deflection means in a direction dependent upon which of each of a second oppositely positioned pair of said antennas receives the energy of said source and at a rate proportional to the output signal amplitude of the one of said second pair of antennas that receives the energy from said source.

5. The invention as defined in claim 4, wherein said cathode-ray sweeping means includes simply a detector to sweep the cathode ray of said tube at a rate proportional to the slope of the leading edges of received microwave pulses.

6. The invention as defined in claim 5, wherein each of said deflection means includes a pair of deflection elements, and wherein each of said antennas is connected respectively to a corresponding one of said deflection elements.

7. The invention as defined in claim 4, wherein said cathode ray sweeping means includes a sawtooth generator for impressing sawtooth voltages having slopes proportional to the amplitudes of the output signals of said antennas on each of said deflection means respectively, a gate generator for operating said sawtooth generator, and a threshold gate for passing the output signal of said gate generator to said sawtooth generators when a signal is received by said antennas greater than a predetermined magnitude.

8. A receiver for indicating the angular position of a radiant energy source, said receiver comprising: a first antenna having a vertical line of sight and having a spherical antenna pattern, a second antenna having omnidirectional lines of sight in a horizontal plane and having a horizontally disposed toroidal antenna pattern with the inside diameter of toroid being equal to zero, and means for indicating the sum of the output signal amplitudes of said radiators vectorially.

9. The invention as defined in claim 8, wherein said indicating means includes a cathode-ray tube having two deflection means disposed 90 degrees about its longitudinal axis, and means for sweeping the beam of said tube along the axis of one of said deflection means at a rate proportional to the output signal amplitude of said first antenna and for sweeping the cathode ray of said tube along the axis of said other deflection means at a rate proportional to the output signal amplitude of said second antenna.

10. The invention as defined in claim 9, wherein said cathode-ray sweeping means includes simply a detector to sweep the cathode ray of said tube at a rate proportional to the slope of the leading edges of received microwave pulses.

11. The invention as defined in claim 9, wherein said cathode ray sweeping means includes a sawtooth generator for impressing sawtooth voltages having slopes proportional to the amplitudes of the output signals of said antennas on each of said deflection means respectively, a gate generator for operating said sawtooth generator, and a threshold gate for passing the output signal of said gate generator to said sawtooth generators when a signal is received by said antennas greater than a predetermined magnitude.

References Cited in the file of this patent

UNITED STATES PATENTS

| | | |
|---|---|---|
| 2,432,625 | Klein | Dec. 16, 1947 |
| 2,435,253 | Turner | Feb. 3, 1948 |
| 2,808,583 | Mathes | Oct. 1, 1957 |